United States Patent
Kato et al.

(10) Patent No.: US 8,831,828 B2
(45) Date of Patent: *Sep. 9, 2014

(54) IN-VEHICLE INFORMATION SYSTEM, IN-VEHICLE APPARATUS AND INFORMATION TERMINAL

(71) Applicant: Clarion Co., Ltd., Saitama (JP)

(72) Inventors: Ryohei Kato, Yokohama (JP); Norikazu Nara, Matsudo (JP)

(73) Assignee: Clarion Co., Ltd., Saitama-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/861,956

(22) Filed: Apr. 12, 2013

(65) Prior Publication Data

US 2013/0274998 A1  Oct. 17, 2013

(30) Foreign Application Priority Data

Apr. 13, 2012  (JP) ................................ 2012-091614

(51) Int. Cl.
G06F 17/00 (2006.01)
B60K 37/06 (2006.01)

(52) U.S. Cl.
CPC ........... *G06F 17/00* (2013.01); *B60K 2350/906* (2013.01); *B60K 37/06* (2013.01)
USPC ............................. 701/36; 701/400; 701/418

(58) Field of Classification Search
None
See application file for complete search history.

(56) References Cited

U.S. PATENT DOCUMENTS

| | | | |
|---|---|---|---|
| 2005/0060670 A1* | 3/2005 | Inui et al. | 715/867 |
| 2011/0065375 A1* | 3/2011 | Bradley | 455/1 |
| 2012/0046020 A1* | 2/2012 | Tomasini | 455/418 |
| 2012/0109451 A1* | 5/2012 | Tan | 701/36 |
| 2012/0253597 A1* | 10/2012 | Nada et al. | 701/36 |
| 2013/0029654 A1* | 1/2013 | Lesyna | 455/418 |
| 2013/0190978 A1 | 7/2013 | Kato et al. | |

FOREIGN PATENT DOCUMENTS

| | | |
|---|---|---|
| EP | 2 149 473 A2 | 3/2010 |
| JP | 2003-222523 A | 8/2003 |
| WO | WO 2012/023017 A2 | 2/2012 |
| WO | WO 2012/036279 A1 | 3/2012 |

OTHER PUBLICATIONS

European Search Report dated Aug. 19, 2013 (Four (4) pages.

* cited by examiner

*Primary Examiner* — John R Olszewski
*Assistant Examiner* — Nicholas K Wiltey
(74) *Attorney, Agent, or Firm* — Crowell & Moring LLP

(57) ABSTRACT

An in-vehicle information system includes: an information terminal; and an in-vehicle apparatus. At least one of the information terminal and the in-vehicle apparatus decides whether or not a vehicle is currently in a traveling state. The in-vehicle apparatus includes a display unit with a display screen, and restricts an image area ranging over part of or all of the display screen to be obscured from view when deciding that the vehicle is currently in a traveling state. The information terminal includes an application stored therein, outputs an image corresponding to the application to the in-vehicle apparatus, and outputs regulatory information pertaining to an image area to be restricted within the image corresponding to the application, to the in-vehicle apparatus. The in-vehicle apparatus sets an image area in the display screen to be restricted by using the regulatory information output by the information terminal.

18 Claims, 14 Drawing Sheets

IN-VEHICLE INFORMATION SYSTEM, IN-VEHICLE APPARATUS AND INFORMATION TERMINAL

INCORPORATION BY REFERENCE

The disclosure of the following priority application is herein incorporated by reference: Japanese patent application no. 2012-091614 filed Apr. 13, 2012.

BACKGROUND OF THE INVENTION

1. Field of the Invention

The present invention relates to an in-vehicle information system. It also relates to an in-vehicle apparatus and an information terminal used in the in-vehicle information system.

2. Description of Related Art

There is an in-vehicle apparatus known in the related art that pre-assigns each software application program installed in the in-vehicle apparatus with a specific identification symbol indicating that operation of the particular application while the vehicle is traveling is either allowed or disallowed and determines, based upon such identification symbols, applications, the operations of which are to be disallowed while the vehicle travels so as to assure safe vehicle operation (see Japanese Laid Open Patent Publication No. 2003-222523).

SUMMARY OF THE INVENTION

The technology disclosed in Japanese laid open patent publication no. 2003-222523 is adopted in control of the execution of applications installed in an in-vehicle apparatus. This means that it cannot be adopted in control of the execution of applications installed in an information terminal, such as a portable telephone or a smart phone connected to the in-vehicle apparatus.

According to the 1st aspect of the present invention, an in-vehicle information system, comprises: an information terminal; and an in-vehicle apparatus installed in a vehicle, wherein: at least one of the information terminal and the in-vehicle apparatus includes a traveling decision-making unit that makes a decision as to whether or not the vehicle is currently in a traveling state; the in-vehicle apparatus includes a display unit that displays an image at a display screen, and a display regulating unit that restricts an image area ranging over part of or all of the display screen to be obscured from view when the traveling decision-making unit decides that the vehicle is currently in a traveling state; the information terminal includes a first storage unit in which an application is stored, an image output unit that outputs an image corresponding to the application to the in-vehicle apparatus, and a regulatory information output unit that outputs regulatory information pertaining to an image area to be restricted by the display regulating unit within the image corresponding to the application, to the in-vehicle apparatus; and the display regulating unit sets an image area in the display screen to be restricted for being obscured from view by using the regulatory information output by the regulatory information output unit.

According to the 2nd aspect of the present invention, in the in-vehicle information system according to the 1st aspect, it is preferred that: the in-vehicle apparatus further includes a second storage unit in which a regulatory image, to be used to restrict part of or all of the display screen to be obscured from view, is stored; and the display regulating unit restricts an image area ranging over part of or all of the display screen to be obscured from view by using the regulatory image.

According to the 3rd aspect of the present invention, in the in-vehicle information system according to the 2nd aspect, it is preferred that: the regulatory information specifies the regulatory image to be used by the display regulating unit.

According to the 4th aspect of the present invention, in the in-vehicle information system according to the 1st or 2nd aspect, it is preferred that: the regulatory information specifies a shape of an image area to be restricted for being obscured from view.

According to the 5th aspect of the present invention, in the in-vehicle information system according to any one of the 1st through 4th aspects, it is preferred that: the display unit includes a touch panel at which a touch operation is accepted; and the in-vehicle apparatus further includes an operation information transmission unit that transmits, in response to the touch operation performed in an image area that is not restricted not to be obscured from view by the display regulating unit, operation information corresponding to the touch operation to the information terminal and does not transmit, following the touch operation performed in an image area that is restricted to be obscured from view by the display regulating unit, operation information corresponding to the touch operation to the information terminal.

According to the 6th aspect of the present invention, in the in-vehicle information system according to any one of the 1st through 5th aspects, it is preferred that: an image area restricted by the display regulating unit to be obscured from view is an image area where at least one of an image enabling text input, an image that changes constantly and a photographic image is displayed.

According to the 7th aspect of the present invention, an in-vehicle apparatus that is installed in a vehicle and can be connected to an information terminal at which execution of an application is underway, comprises: a display unit that displays an image corresponding to the application, which is input from the information terminal, at a display screen; and a display regulating unit that restricts an image area ranging over part of or all of the display screen to be obscured from view while the vehicle is in a traveling state, wherein: regulatory information pertaining to an image area restricted by the display regulating unit within the image corresponding to the application, is input from the information terminal.

According to the 8th aspect of the present invention, in the in-vehicle apparatus according to the 7th aspect, it is preferred that: there is further provided a storage unit in which a regulatory image to be used to restrict an image area ranging over part of or all of the display screen to be obscured from view, is stored; and the display regulating unit restricts the image area ranging over part of or all of the display screen by using the regulatory image to be obscured from view.

According to the 9th aspect of the present invention, in the in-vehicle apparatus according to the 8th aspect, it is preferred that: the regulatory information specifies the regulatory image to be used by the display regulating unit.

According to the 10th aspect of the present invention, in the in-vehicle apparatus according to the 7th or 8th aspect, it is preferred that: the regulatory information specifies a shape of an image area to be restricted for being obscured from view.

According to the 11th aspect of the present invention, in the in-vehicle apparatus according to any one of the 7th through 10th aspects, it is preferred that: the display unit includes a touch panel where a touch operation is accepted; and there is further provided an operation information transmission unit that transmits, in response to the touch operation performed in an image area that is not restricted not to be obscured from by the display regulating unit, operation information corresponding to the touch operation to the information terminal and does not transmit, following the touch operation performed in an image area that is restricted to be obscured from by the display regulating unit, operation information corresponding to the touch operation to the information terminal.

According to the 12th aspect of the present invention, in the in-vehicle apparatus according to any one of the 7th through 11th aspects, it is preferred that: an image area restricted by the display regulating unit to be obscured from view is an image area where at least one of an image enabling text input, an image that changes constantly and a photographic image is displayed.

According to the 13th aspect of the present invention, in the in-vehicle apparatus according to any one of the 7th through 12th, it is preferred that there is further provided a traveling decision-making unit that makes a decision as to whether or not the vehicle is currently in a traveling state.

According to the 14th aspect of the present invention, an information terminal that can be connected to an in-vehicle apparatus including a display unit, comprises: a first storage unit in which an application is stored, an image output unit that outputs an image corresponding to the application to the in-vehicle apparatus; and a regulatory information output unit that outputs regulatory information pertaining to an image area to be restricted for being obscured from view at the display unit within the image corresponding to the application, to the in-vehicle apparatus.

According to the 15th aspect of the present invention, in the information terminal according to the 14th aspect, it is preferred that there is further provided a traveling decision-making unit that makes a decision as to whether or not a vehicle in which the in-vehicle apparatus is installed is currently in a traveling state.

DESCRIPTION OF PREFERRED EMBODIMENTS

First Embodiment

Configuration of the In-Vehicle Information System

Figure 1:
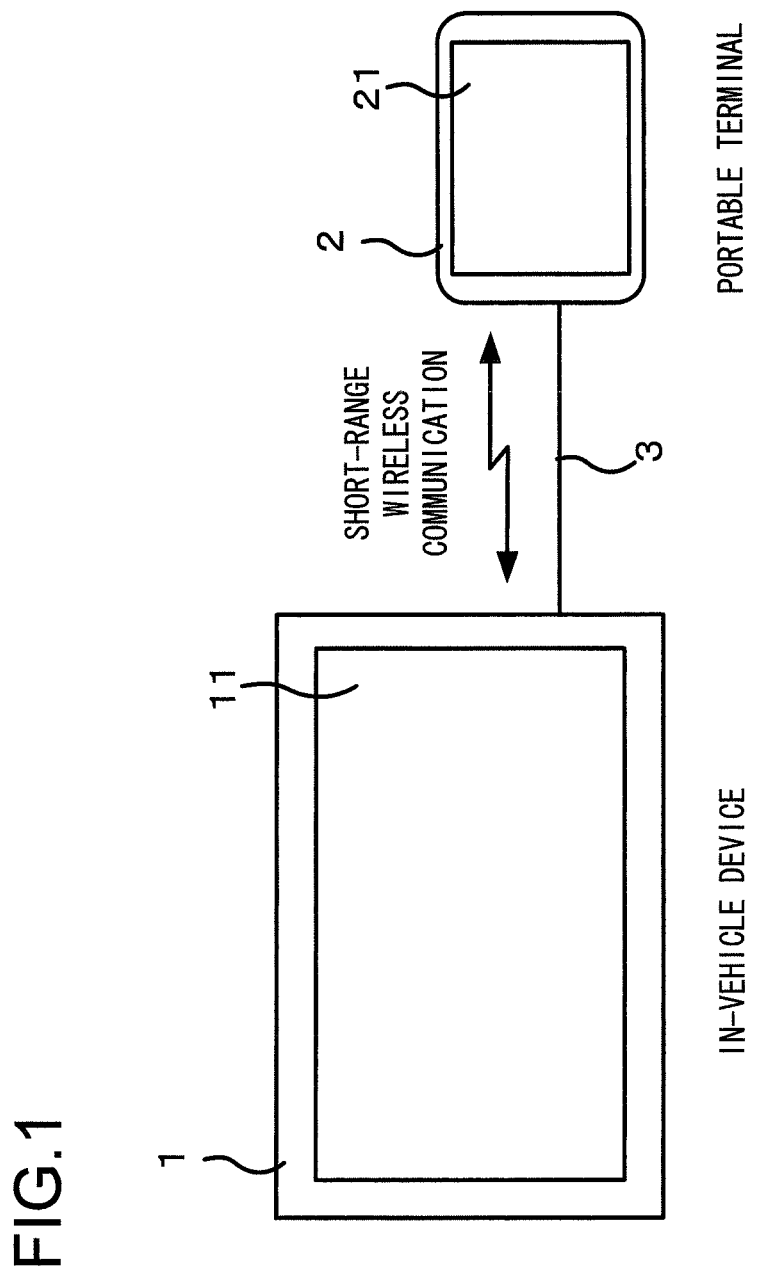
FIG. 1 shows the configuration of the in-vehicle information system achieved in a first embodiment of the present invention.

FIG. 1 shows the configuration of the in-vehicle (in-car or onboard) information system achieved in the first embodiment of the present invention. The in-vehicle information system in FIG. 1, which is used as an in-vehicle system installed in a vehicle (e.g. a car), is configured by connecting an in-vehicle apparatus 1 with a portable terminal 2 through short-range wireless communication and through wired communication enabled via a communication cable 3. The in-vehicle apparatus 1 is installed at a fixed position within the vehicle, at, for instance, the instrument panel in the vehicle. The portable terminal 2 is a portable information terminal that can be carried by the user, such as a portable telephone or a smart phone. The short-range wireless communication may be carried out between the in-vehicle apparatus 1 and the portable terminal 2 in compliance with, for instance, the Bluetooth (registered trademark) standard. In addition, the communication cable 3 may be, for instance, a USB cable or an HDMI (registered trademark) cable.

The in-vehicle apparatus 1 includes a display unit 11. The display unit 11 is a touch panel-type display monitor at which various types of still images and video can be displayed. It may be configured by combining, for instance, a touch sensor capable of detecting a position at which it has been touched and a liquid crystal display unit. The user is able to issue an instruction for the in-vehicle apparatus 1 to execute a desired function by touching a given position on the display unit 11 with his finger or the like, in correspondence to the content of an image or video on display at the display unit 11. It is to be noted that while the display unit 11 in the embodiment is constituted with a touch panel-type display monitor, the present invention may be adopted in conjunction with a standard display monitor instead of a touch panel-type display monitor. In such a case, it is desirable that the in-vehicle apparatus 1 include various types of operation switches corresponding to specific details of processing executed by the in-vehicle apparatus 1. As an alternative, the present invention may be adopted in conjunction with a display unit 11 constituted with a touch panel-type display monitor in an in-vehicle apparatus 1 that also includes operation switches, each corresponding to a specific operation.

A display unit 21 is disposed at the portable terminal 2. The display unit 21 is a touch panel-type display monitor at which various types of still images and video can be displayed. It may be configured by combining, for instance, a touch sensor capable of detecting a position at which it has been touched and a liquid crystal display unit. The user is able to issue an instruction for the portable terminal 2 to execute a desired function by touching a given position on the display unit 21 with his finger or the like, in correspondence to the content of an image or video on display at the display unit 21. It is to be noted that while the display unit 21 in the embodiment is constituted with a touch panel-type display monitor, the present invention may be adopted in conjunction with a standard display monitor instead of a touch panel-type display monitor. In such a case, it is desirable that the portable terminal 2 include various types of operation switches corresponding to specific details of processing executed by the portable terminal 2. As an alternative, the present invention may be adopted in conjunction with a display unit 21 constituted with a touch panel-type display monitor in an portable terminal 2 that also includes operation switches, each corresponding to a specific operation.

Figure 2:
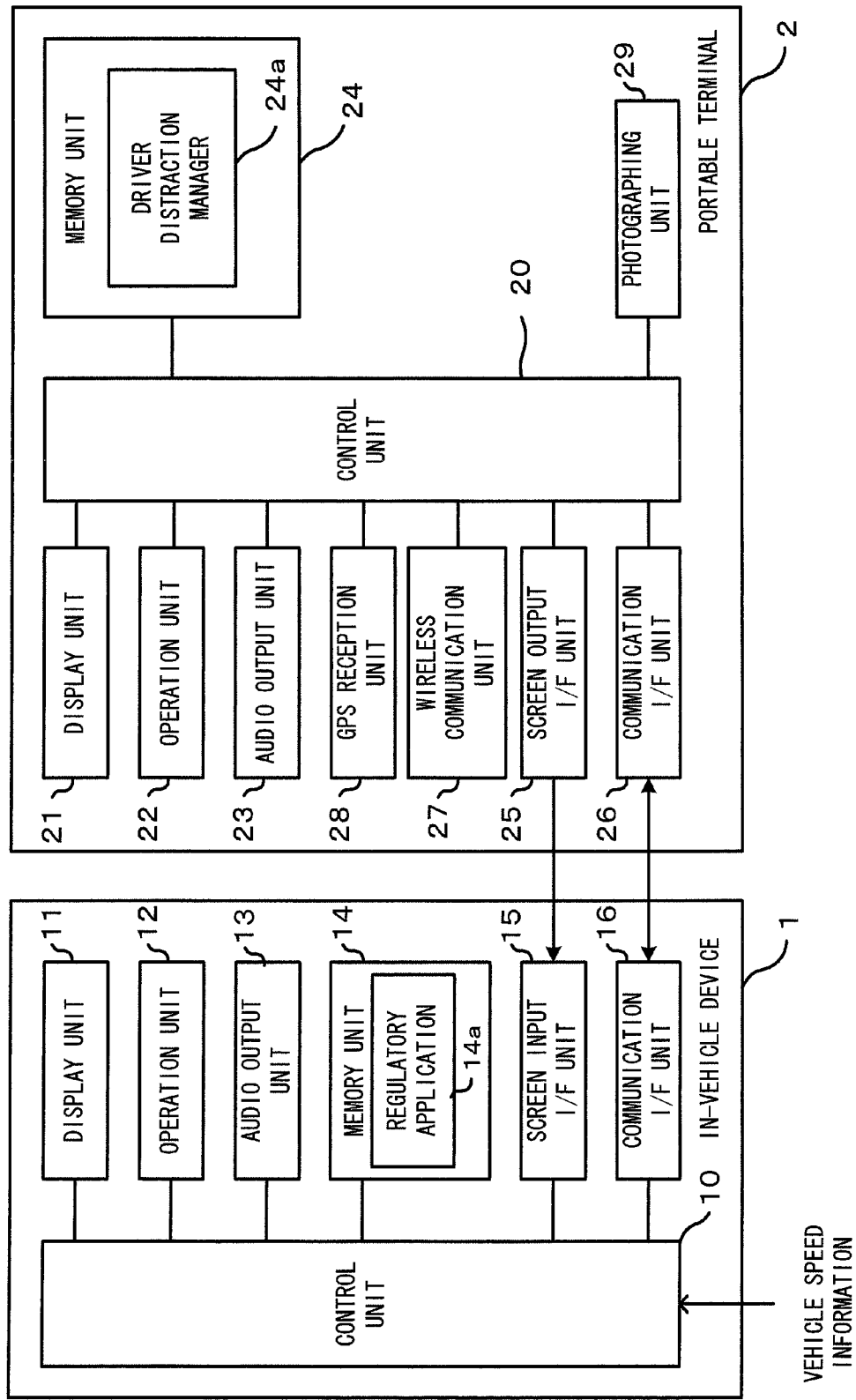
FIG. 2 is a block diagram presenting structural examples pertaining to the in-vehicle apparatus and the portable terminal configuring the in-vehicle information system in the first embodiment of the present invention.

FIG. 2 is a block diagram showing the structures of the in-vehicle apparatus 1 and the portable terminal 2 which constitute the in-vehicle information system achieved in the first embodiment. As shown in FIG. 2, the in-vehicle apparatus 1 includes a control unit 10, the display unit 11, an operation unit 12, an audio output unit 13, a memory unit 14, a screen input interface (I/F) unit 15 and a communication interface (I/F) unit 16. The portable terminal 2 includes a control unit 20, the display unit 21, an operation unit 22, an audio output unit 23, a memory unit 24, a screen output interface (I/F) unit 25, a communication interface (I/F) unit 26, a wireless communication unit 27, a GPS (global positioning system) reception unit 28 and a photographing unit 29.

The control unit 10 in the in-vehicle apparatus 1, which is constituted with a microprocessor, various peripheral circuits, a RAM, a ROM and the like, executes various types of processing based upon a control program and application programs (hereafter simply referred to as applications) recorded in the memory unit 14. Various types of image display processing, audio output processing and the like are enabled as processing executed by the control unit 10.

In addition, the control unit 10 obtains vehicle speed information output from the vehicle. The control unit 10 is able to determine whether or not the vehicle is currently in a traveling state by checking whether or not the vehicle speed information indicates 0. It is to be noted that the vehicle speed information provided in the form of, for instance, a vehicle speed pulse output from a vehicle speed sensor installed in the vehicle, is output to the control unit 10 through a CAN (controller area network) (not shown), which is a communication network installed in the vehicle.

As explained earlier, the display unit 11 is a touch panel-type display monitor. The operation unit 12 is used for purposes of user input operation detection. It is to be noted that while the display unit 11 and the operation unit 12 are shown as separate structural elements in FIG. 2, the operation unit 12 is, in fact, configured as an integrated part of the touch panel-type display unit 11. In the alternative configuration described earlier, which includes operation switches disposed at the in-vehicle apparatus 1, the operation switches correspond to the operation unit 12. Details of a user input operation performed at the operation unit 12 are output to the control unit 10 and are reflected in processing executed by the control unit 10.

The audio output unit 13, which includes an amplifier, a speaker and the like, is capable of outputting various types of sound under control executed by the control unit 10. Audio data of content read out from the portable terminal 2 or a recording medium (not shown), guidance audio data to be used, for instance, to guide the vehicle to a destination and the like, are output as sound from the audio output unit 13.

The memory unit 14, which is a non-volatile data storage device, may be constituted with an HDD (hard disk drive), a flash memory or the like. Various types of data, including the control program executed by the control unit 10, as explained earlier, and a regulatory application 14*a* (to be described in detail later), are stored in the memory unit 14. Data are read out from the memory unit 14 and written into the memory unit 14 as needed under control executed by the control unit 10.

The screen input interface unit 15 receives screen information transmitted from the portable terminal 2 by executing interface processing to enable communication via the communication cable 3 or through short-range wireless communication under control executed by the control unit 10. The screen information received via the screen input interface unit 15 is output to the control unit 10, which then uses the screen information for screen display at the display unit 11. It is to be noted that the screen information may include audio data and, in such a case, the audio data are provided to the audio output unit 13, as explained earlier.

The communication interface unit 16 executes interface processing to enable communication via the communication cable 3 or through short-range wireless communication under control executed by the control unit 10. The control unit 10 transmits, via the communication interface unit 16, coordinate information pertaining to the position at which the user has touched the touch panel at the display unit 11 and also receives, via the communication interface unit 16, various types of information from the portable terminal 2.

The control unit 20 in the portable terminal 2 is constituted with a microprocessor, various peripheral circuits, a RAM, a ROM and the like, as is the control unit 10 in the in-vehicle apparatus 1, and executes various types of processing based upon a control program recorded in the memory unit 24.

As explained earlier, the display unit 21 is a touch panel-type display monitor. The control unit 22 is used for purposes of user input operation detection. It is to be noted that while the display unit 21 and the operation unit 22 are shown as separate structural elements in FIG. 2, the operation unit 22 is, in fact, configured as an integrated part of the touch panel-type display unit 21. In the alternative configuration described earlier, which includes operation switches disposed at the portable terminal 2, the operation switches correspond to the operation unit 22. Details of a user input operation performed at the operation unit 22 are output to the control unit 20 and are reflected in processing executed by the control unit 20.

The audio output unit 23, which includes an amplifier, a speaker and the like, is capable of outputting various types of sound under control executed by the control unit 20. During a phone conversation carried out via the portable terminal 2, for instance, the voice of the other party is output from the audio output unit 23.

In the memory unit 24, which is a non-volatile data storage device similar to the memory unit 14 in the in-vehicle apparatus 1, various types of data to be used in the processing executed by the control unit 20 are stored. An application program referred to as a driver distraction manager 24a, which is to be described in detail later, is stored in advance in the memory unit 24. Various application programs acquired by the user in advance are also stored in the memory unit 24. For instance, a navigation application that provides route guidance to the user, a media player application enabling playback of content such as sound and video, a clock display application that features photographic images and the like, are stored in the memory unit 24. Furthermore, content data such as video image data to be played by the media player application are also stored in the memory unit 24.

The screen output interface unit 25 outputs screen information pertaining to the screen on display at the display unit 21 of the portable terminal 2, to the in-vehicle apparatus 1 by executing interface processing to enable communication via the communication cable 3 or through short-range wireless communication under control executed by the control unit 20. Such screen information may include audio data. The screen information output from the screen output interface unit 25 is input to the control unit 10 in the in-vehicle apparatus 1 via the screen input interface unit 15 at the in-vehicle apparatus 1.

The communication interface unit 26 executes interface processing to enable communication via the communication cable 3 or through short-range wireless communication under control executed by the control unit 20. The control unit 20 exchanges information with the communication interface unit 16 in the in-vehicle apparatus 1 via the communication interface unit 26. In other words, the control unit 20 engages the communication interface unit 26 in operation in order to transmit various types of information to the in-vehicle apparatus 1 and receive the coordinate information pertaining to the position at which the user has touched the touch panel at the display unit 11 and the like from the in-vehicle apparatus 1.

Through wireless communication carried out via the wireless communication unit 27, the portable terminal 2 is able to connect with another portable terminal or a server via a wireless communication network (not shown). Through the wireless communication carried out via the wireless communication unit 27, the user of the portable terminal 2 is able to have a telephone conversation with the user of another portable terminal, download applications from a server, and the like. It is to be noted that the wireless communication network enabling wireless communication carried out via the wireless communication unit 27 may be, for instance, a portable telephone network or the Internet, connection with which can be established via a wireless LAN.

The GPS reception unit 28 receives a GPS signal transmitted from GPS satellites and outputs the GPS signals thus received to the control unit 20. Each GPS signal carries information that can be used to determine the current position of the portable terminal 2 and the current time. More specifically, it carries information indicating the position of the GPS satellite having transmitted the particular GPS signal and the transmission time point at which the GPS signal was transmitted. Thus, the current position and the current time can be calculated in the control unit 20 based upon information carried in GPS signals received from a predetermined minimum number of GPS satellites. The control unit 20 in the portable terminal 2 is able to output information pertaining to the current position to the in-vehicle apparatus 1 via the communication interface unit 26. The in-vehicle apparatus 1 may detect the traveling state of the vehicle by checking for any change indicated in the information pertaining to the current position.

The photographing unit 29, which may be a camera module equipped with a photographic optical system and an image sensor, captures a subject image having passed through the photographic optical system. The image data expressing the captured image are stored into the memory unit 24.

It is to be noted that FIG. 2 simply presents examples of structures that may be adopted in the in-vehicle apparatus 1 and the portable terminal 2. For instance, it is not strictly necessary that the control unit 10 in the in-vehicle apparatus 1 obtain the vehicle speed information from the vehicle. In addition, the portable terminal 2 does not need to be equipped with the GPS reception unit 28, the photographing unit 29 or the like.

(Coordinated Function Achieved by the In-Vehicle Apparatus 1 and the Portable Terminal 2)

In an in-vehicle information system such as that shown in FIG. 1, the in-vehicle apparatus 1 and the portable terminal 2 operate in coordination with each other and achieve a function that may be referred to as a terminal mode or a coordinated function. While such a coordinated function is in effect, the in-vehicle apparatus 1 and the portable terminal 2 are connected with each other via the communication cable 3 or through short-range wireless communication.

If an application is executed while the portable terminal 2 is operating in coordination with the in-vehicle apparatus 1, an image or sound corresponding to the particular application is output and displayed at the display unit 21 or is output via the audio output unit 23. The image or the sound output at the display unit 21 or the audio output unit 23 is also transmitted to the in-vehicle apparatus 1 via the screen output interface unit 25 and is thus also output at the display unit 11 or the audio output unit 13 in the in-vehicle apparatus 1.

The user is able to operate this application via the operation unit 12 at the in-vehicle apparatus 1, as well as via the operation unit 22 at the portable terminal 2. An input operation performed by the user at the operation unit 12 of the in-vehicle apparatus 1 is transmitted via the communication interface unit 16, to the portable terminal 2 and the input operation thus transmitted is reflected in the operation of the application currently being executed at the portable terminal 2.

Figure 3A:
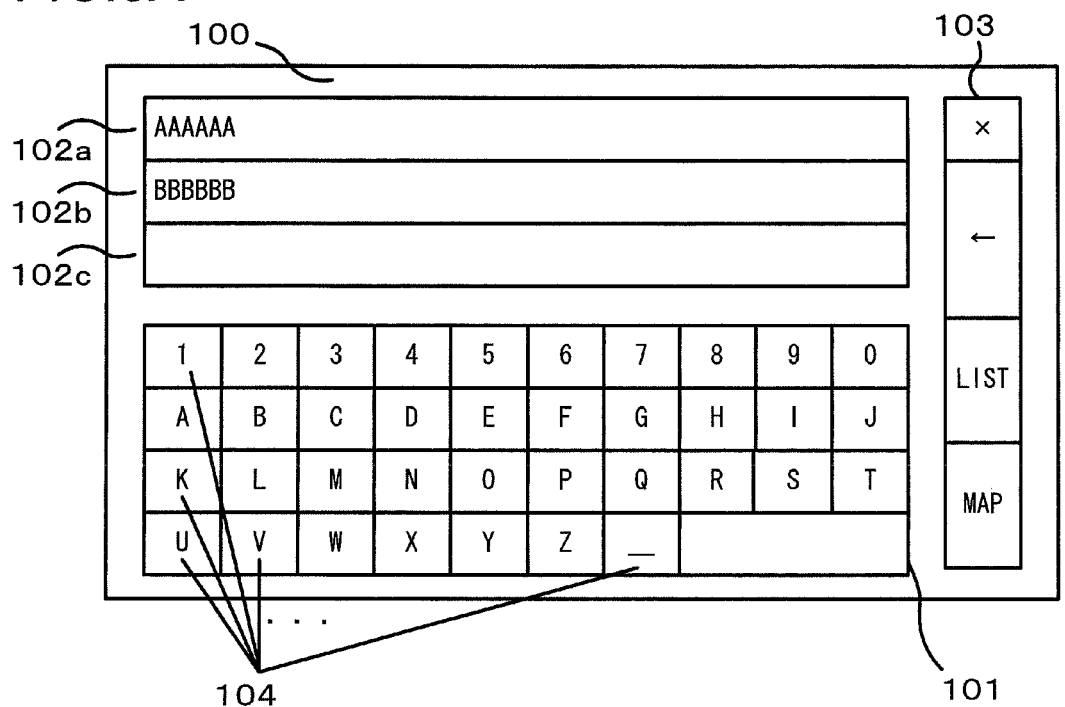
FIGS. 3A and 3B each present an example of a screen that may be brought up on display at the in-vehicle apparatus when executing an application installed in the information terminal in the first embodiment of the present invention.
Figure 3B:
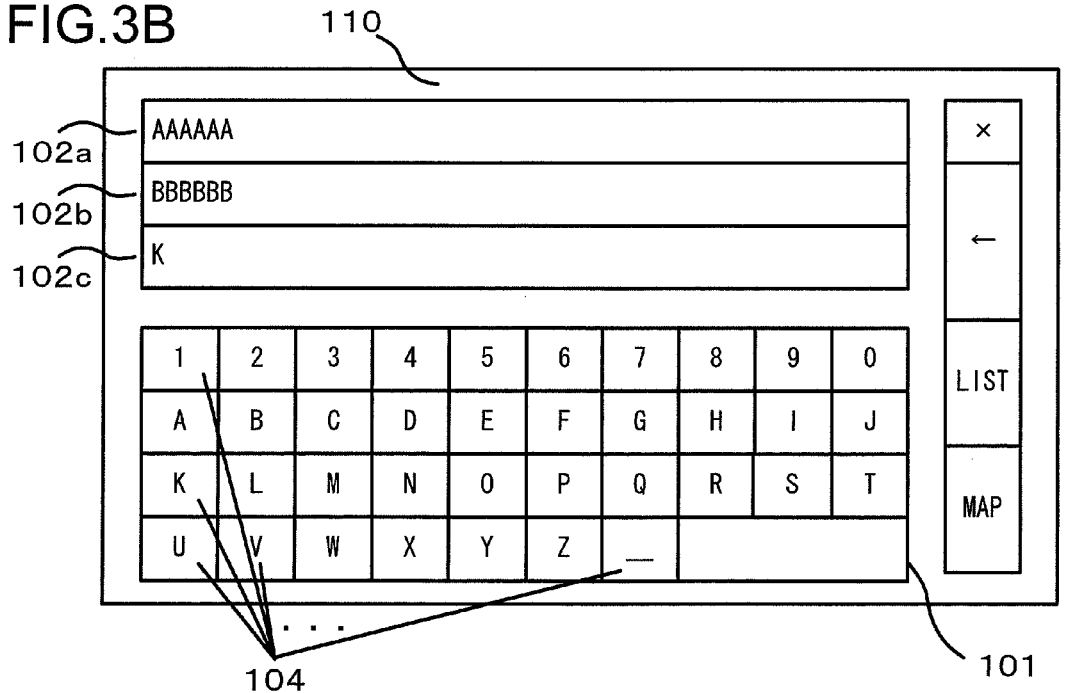

The operations of the in-vehicle apparatus 1 and the portable terminal 2 executed while the coordinated function is in effect are now described by referring to specific examples presented in FIGS. 3A through 6B. FIGS. 3A and 3B each present an example of an image that may be created by the portable terminal 2 while the portable terminal 2 is executing a navigation application. The image shown in FIG. 3A is a route setting screen 100, in which the user is able to set a departure point, a waypoint, a destination and the like for a route through which the navigation application is to provide route guidance. The route setting screen 100 includes a text input area 101, in which a text input operation performed to enter text indicating the name of a location, is accepted, location name display areas 102a through 102c, in which the names of locations entered as the departure point, a waypoint and the destination through text input operation are respectively displayed, and a menu area 103.

The screen information for the route setting screen shown in FIG. 3A is transmitted via the screen output interface unit 25 to the in-vehicle apparatus 1. This screen information is received at the screen input interface unit 15 in the in-vehicle apparatus 1 and is then output to the control unit 10. Based upon the screen information, the control unit 10 brings up the route setting screen 100 on display at the display unit 11 in the in-vehicle apparatus 1.

In the text input area 101, a plurality of button areas 104 (hereafter referred to simply as buttons), each assigned with a character such as an alphanumeric character or a symbol are set in a keyboard-like arrangement. The character, such as an alphanumeric character, or the symbol assigned to each button 104 is on display at the particular button 104 and is thus visible to the user. As the user touches a specific button 104 displayed at the display unit 11, the coordinate information indicating the position (coordinates) specified through the touch operation is transmitted via the communication interface unit 16 to the portable terminal 2. Upon receiving the coordinate information via the communication interface unit 26, the portable terminal 2 determines the button 104 having been touched by the user based upon the coordinate information. The control unit 20 then creates a new screen reflecting the input operation performed by the user. The control unit 20 transmits screen information corresponding to the newly created screen to the in-vehicle apparatus 1 via the screen output interface unit 25.

FIG. 3A shows a route setting screen 110 newly created by the portable terminal 2 after the user has touched the button 104 assigned with "K" in the route setting screen shown in FIG. 3A displayed at the display unit 11 in the in-vehicle apparatus 1. The route setting screen 110, reflecting the touch operation of the user at the button 104 assigned with "K", includes a character "K" added into the location name display area 102c. This route setting screen 110 is brought up on display at the display unit 11 in the in-vehicle apparatus 1, as well as at the display unit 21 of the portable terminal 2.

The user performing an input operation in the text input area 101 is highly likely to focus on the characters and symbols displayed at the buttons 104 over an extended period of time. This means that such an operation performed by the driver while driving the vehicle may cause a traffic accident.

Accordingly, the in-vehicle apparatus 1 uses the regulatory application 14a to impose a restriction by obscuring the input operation area, normally displayed at the display unit 11 to enable text input by the user, while the vehicle is traveling. In other words, the regulatory application 14a restricts the input operation area to be obscured from view or disenables viewing of the input operation area or prevents the input operation area from being viewed. However, it does not impose any restriction over areas that do not distract the driver, such as the menu area 103.

Figure 4:
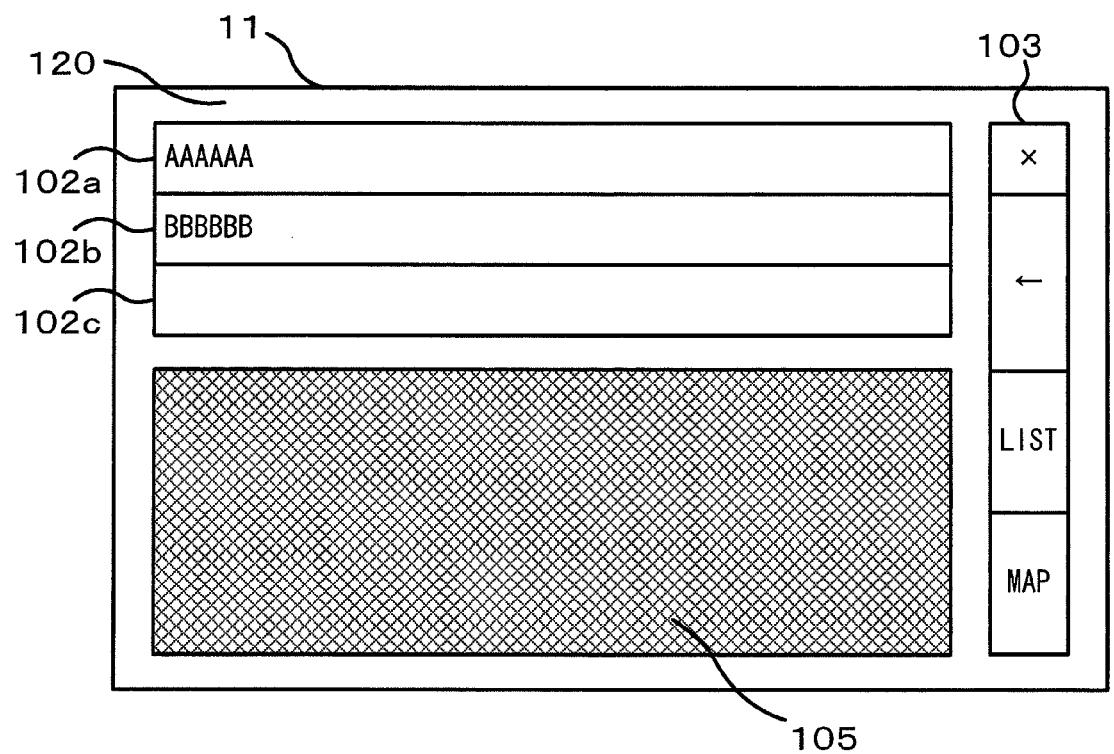
FIG. 4 presents an example of a screen that may be brought up on display at the in-vehicle apparatus when executing an application installed in the information terminal in the first embodiment of the present invention.

In a route setting screen 120 shown in FIG. 4, a mask image 105 is superimposed over the image area where the text input area 101 is displayed in FIG. 3A, thereby obscuring the text input area 101. It is to be noted that while the mask image 105 in FIG. 4 is a uniformly hatched image, a mask image 105 adopting a display mode other than that shown in FIG. 4 may be used instead. In addition, the regulatory application 14a may obscure the text input operation area through a method other than the mask image superimposition described above. For instance, the regulatory application 14a may simply disallow display of the text input operation area.

Even if the user touches an image area on the display screen where the restriction is imposed so as to be obscured from the user, such as the image area where the mask image 105 is displayed at the display unit 11, the control unit 10 does not accept the touch operation.

The in-vehicle apparatus 1 may be used by a user sitting in the passenger seat located next to the driver's seat. If the entire screen on display at the display unit 11 is obscured while the vehicle is traveling, the user sitting in the passenger seat, too, would not be able to operate the in-vehicle apparatus 1. If the user sitting in the passenger seat cannot perform any operation at the in-vehicle apparatus 1, the value of the coordinated function achieved through coordination by the in-vehicle apparatus 1 and the portable terminal 2 will be severely diminished. According to the present invention, the optimal balance between the assurance of safe driving by the driver and realizing the full benefit of the coordinated function can be maintained in a desirable manner by selectively obscuring only an area that could cause driver distraction, such as the text input operation area.

Figure 5A:
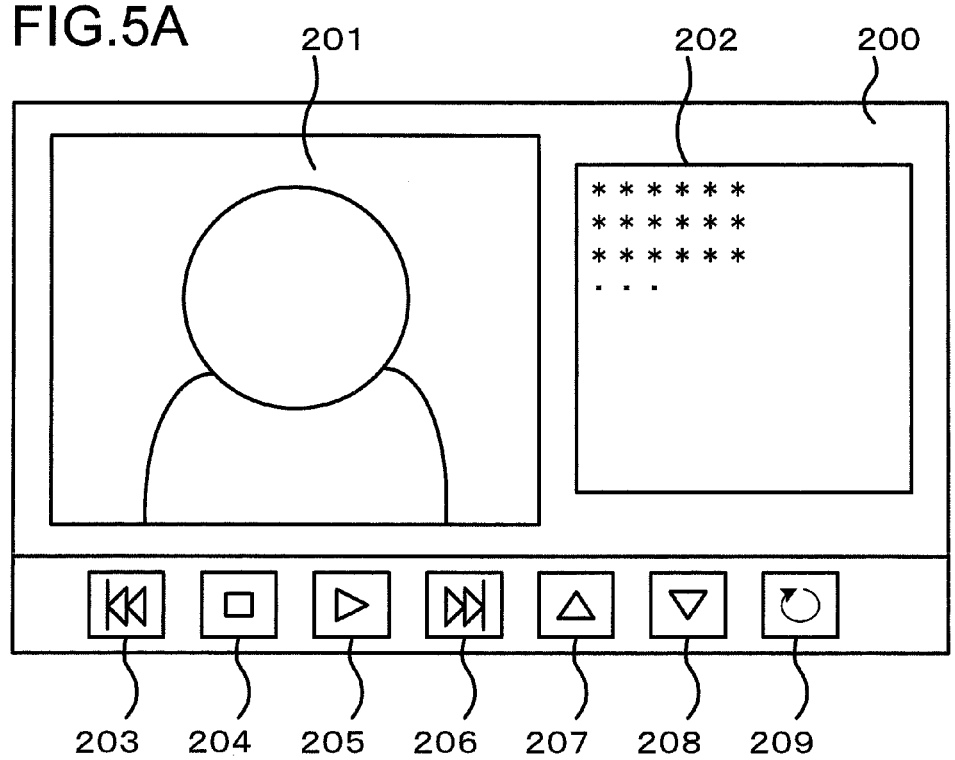
FIGS. 5A and 5B each present an example of a screen that may be brought up on display at the in-vehicle apparatus when executing an application installed in the information terminal in the first embodiment of the present invention.

FIG. 5A presents an example of an image that may be created by the portable terminal 2 while a media player application is being executed at the portable terminal 2. An operation screen 200 shown in FIG. 5A includes a video playback area 201 where a video image in the content currently being played is displayed, an additional information display area 202 where additional information such as title information and artist information appended to the current content is displayed, and operation buttons 203 through 209.

The user touches the operation button 203 when he wishes to rewind the content that are currently being played. The user touches the operation button 204 to stop the content playback. The user touches the operation button 205 to start content playback. The user touches the operation button 206 to fast-forward the content playback. The user is able to control the volume of the sound of the content by touching the operation buttons 207 and 208. The user touches the operation button 209 when he wishes to playback the content again.

Images displayed in the video playback area 201 and the additional information display area 202 are constituted with dynamic image information that changes constantly. For instance, the display content of the video image displayed in the video playback area 201 changes from one frame to the next. In addition, details in the information displayed in the additional information display area 202 change each time a playback of different content starts. The portable terminal 2 creates an operation screen 200 for each frame and transmits screen information corresponding to the particular operation screen 200 to the in-vehicle apparatus 1 via the screen output interface unit 25. The screen input interface unit 15 in the in-vehicle apparatus 1 receives the screen information and outputs the perceived screen information to the control unit 10. The control unit 10 then displays the operation screen 200 at the display unit 11 in the in-vehicle apparatus 1 based upon the screen information.

Images that constantly undergo dynamic change such as those displayed in the video playback area 201 and the additional information display area 202 are more likely to distract the driver, causing the driver to take his eyes off the road and thus giving rise to the risk of an accident. Accordingly, while the vehicle is in a traveling state, the in-vehicle apparatus 1 and the portable terminal 2 impose a restriction so as to obscure the video playback area 201 and the additional information display area 202, as in an operation screen 21 shown in FIG. 5B.

Figure 5B:
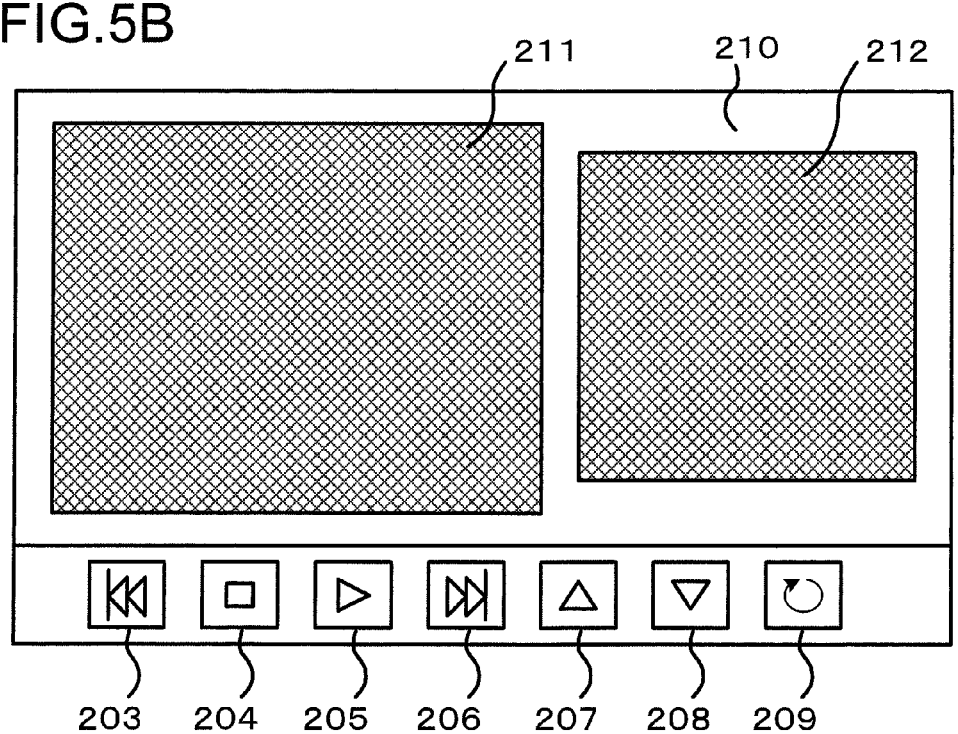

FIG. 5B shows a mask image 211 and a mask image 212 superimposed over the video playback area 201 and the additional information display area 202. However, no mask image is displayed over areas such as the operation buttons 203 through 209, which are not likely to cause driver distraction. Thus, the user in the passenger seat is able to operate the media player application.

Figure 6A:
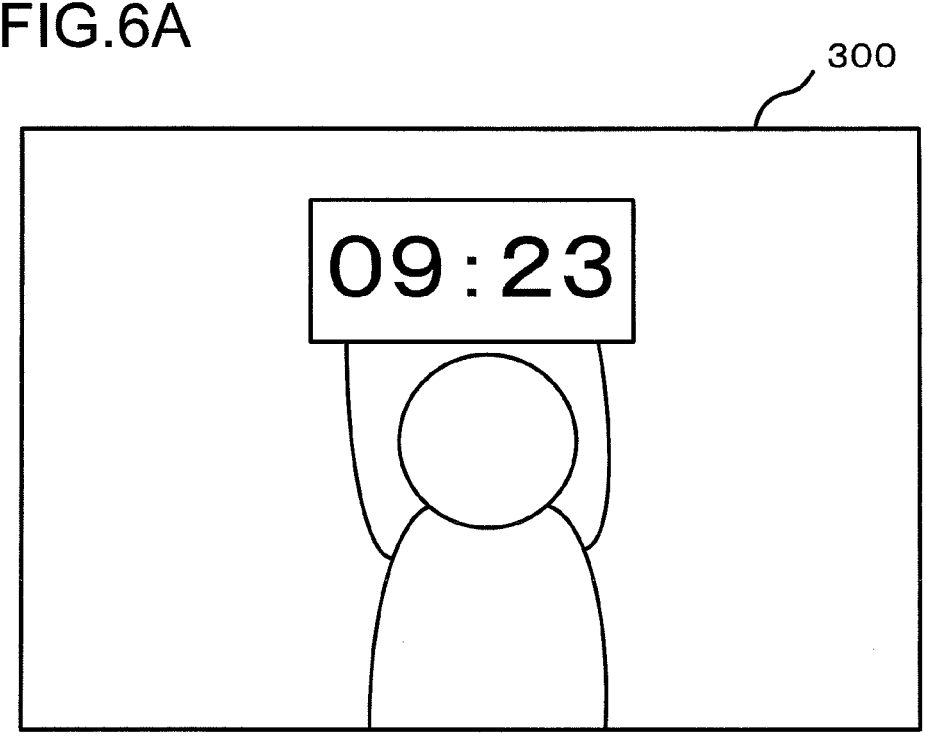
FIGS. 6A and 6B each present an example of a screen that may be brought up on display at the in-vehicle apparatus when executing an application installed in the information terminal in the first embodiment of the present invention.
Figure 6B:
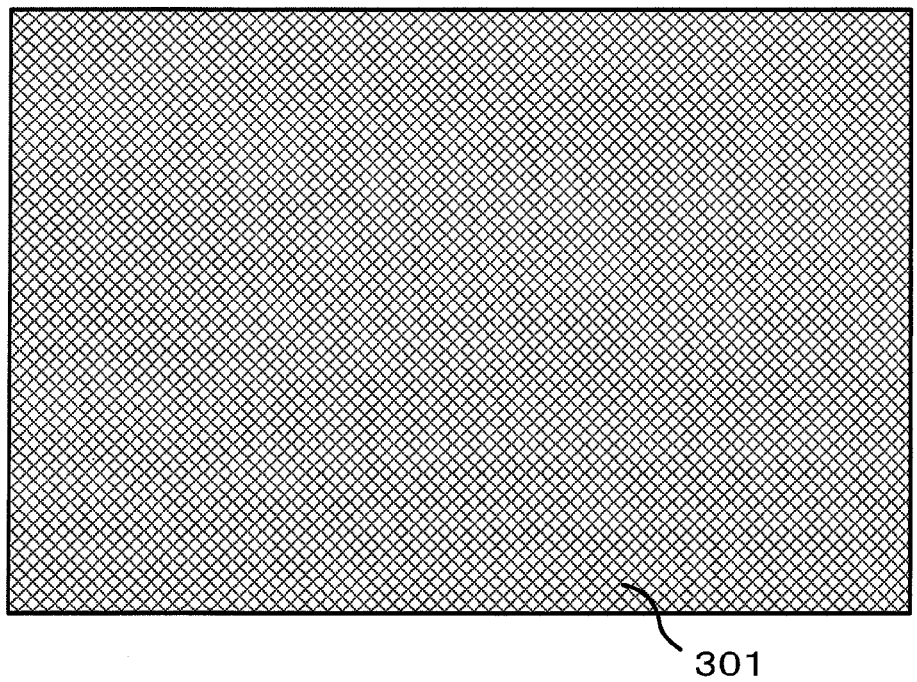

FIG. 6A presents an example of a display screen that may be created by the portable terminal 2 while a clock display application, featuring photographic images, is being executed at the portable terminal 2. In a clock display screen 300 in FIG. 6A, a photographic image with the current time indicated over an area thereof is displayed over the entire display screen at the display unit 11. The photographic image with the current time indicated over part thereof in the clock display screen 300 is switched every minute. The portable terminal 2 creates a clock display screen 300 every minute and transmits screen information corresponding to the clock display screen 300 having been created to the in-vehicle apparatus 1 via the screen output interface unit 25. The screen input interface unit 15 in the in-vehicle apparatus 1 receives the screen information and outputs the received screen information to the control unit 10. The control unit 10 then brings up the clock display screen 300 at the display unit 11 in the in-vehicle apparatus 1 based upon the screen information.

The driver's attention is likely to be drawn to a photographic image or a captured image taken by the photographing unit 29 on display at the display unit 11 in the in-vehicle apparatus 1 and thus, such a display of images may create the risk of a traffic accident. For this reason, while the vehicle is in a traveling state, the in-vehicle apparatus 1 and the portable terminal 2 impose a restriction so as to obscure any photographic image displayed by the clock display application, a photo frame application or the like. In the example presented in FIG. 6B, a mask image 301 is superimposed over the photographic image displayed in the screen shown in FIG. 6A, thereby obscuring the captured image.

At the portable terminal 2, an application selected by the user, among the applications stored in the memory unit 24, is executed. While a menu screen is on display at the display unit 21 of the portable terminal 2, the user is able to select a desired application by operating the operation unit 22. The screen information for this menu screen is transmitted to the in-vehicle apparatus 1 from the screen output interface unit 25. As a result, the menu screen enabling application selection is also brought up on display at the display unit 11 in the in-vehicle apparatus 1. The user is thus able to select an application he wishes to have executed at the portable terminal 2 by operating the operation unit 12 instead.

The driver distraction manager 24a is an application executed when the coordinated function is in effect. It is executed in the foreground if no other application is currently being executed by the control unit 20. If, on the other hand, another application is being executed by the control unit 20, the driver distraction manager 24a is executed in the background. It is to be noted that the term "another application" is not used in this context to refer to a control program such as the operating system for the portable terminal 2.

If the user selects an application via the operation unit 12 or the operation unit 22 while the driver distraction manager 24a is being executed in the foreground, the selected application is identified based upon the coordinate information. For instance, if the navigation application has been selected, the navigation application is read out from the memory unit 24 by the driver distraction manager 24a. Subsequently, the navigation application is executed in the foreground and the driver distraction manager 24a is executed in the background.

The driver distraction manager 24a determines a restriction imposed image area to be obscured while the vehicle remains in a traveling state, in correspondence to the application, the execution of which has started in the foreground. In more specific terms, the driver distraction manager 24a may determine an image area where a mask image, e.g., the mask image 105 (see FIG. 4), the mask images 211 and 212 (see FIG. 5B) or the mask image 301 (see FIG. 6B), is to be displayed.

Figure 7:
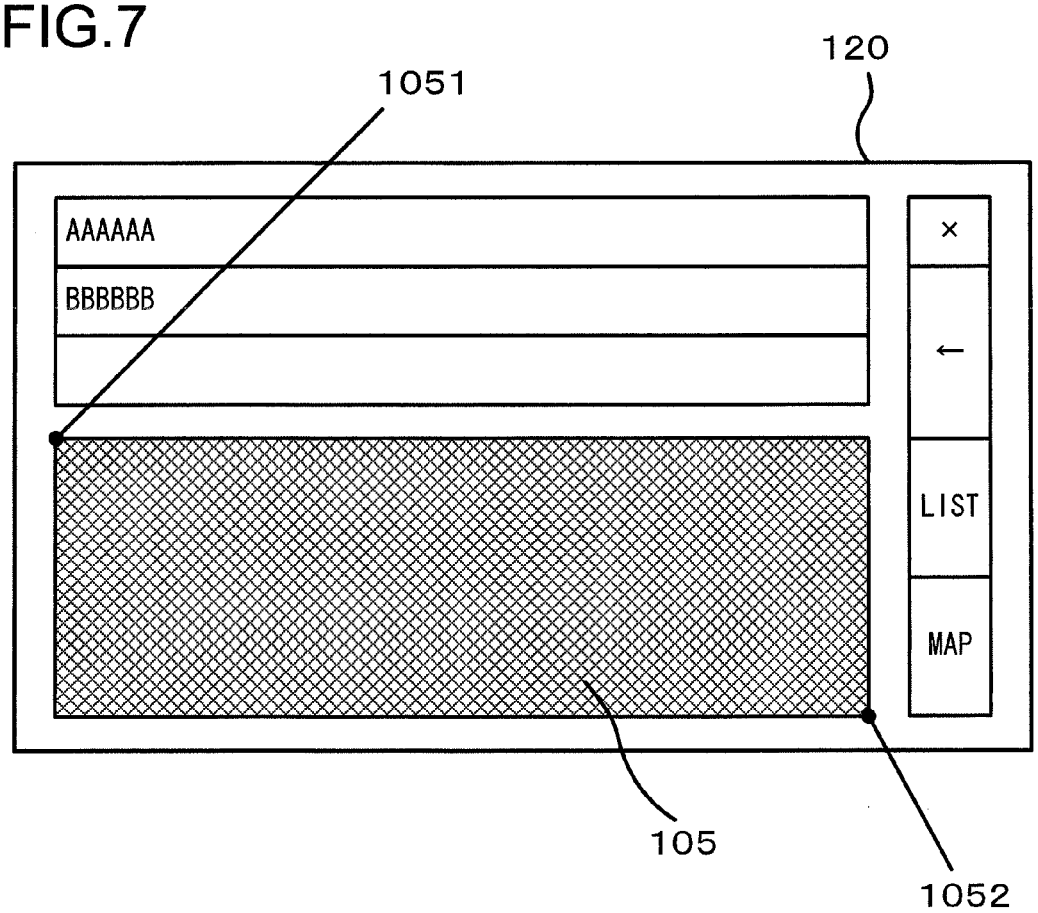
FIG. 7 illustrates how a specific image area may be designated as a non-display area while the vehicle is traveling.

In the memory unit 24, information (hereafter referred to as regulatory information) pertaining to each restriction imposed area, to be obscured from view while the vehicle is traveling, is stored in correspondence to each application. For instance, regulatory information pertaining to the image area where the mask image 105 is to be displayed, as shown in FIG. 4, is stored in the memory unit 24, in correspondence to the navigation application in FIG. 3A. The coordinates (50, 200) and the coordinates (700, 430) of a pair of vertices 1051 and 1052, facing opposite each other, as shown in FIG. 7, of the rectangular mask image 105, are stored as the regulatory information.

The driver distraction manager 24a, reading out an application to be executed in the foreground, reads out the corresponding regulatory information from the memory unit 24. The driver distraction manager 24a then transmits the regulatory information to the in-vehicle apparatus 1 via the communication interface unit 26.

The control unit 10 in the in-vehicle apparatus 1 executes the regulatory application 14a (see FIG. 2) while the coordinated function is in effect. The regulatory application 14a receives the regulatory information transmitted from the portable terminal 2 via the communication interface unit 16. While the vehicle is traveling, the regulatory application 14a regulates display images based upon the regulatory information. For instance, the regulatory application 14a displays the rectangular mask image 105, the vertices of which are set at points indicated by the coordinates (50, 200) and the coordinates (700, 430).

Even if the user touches an obscured restriction imposed image area, the regulatory application 14a does not transmit the coordinate information pertaining to the position (coordinates) specified through the touch operation to the portable terminal 2.

Figure 8:
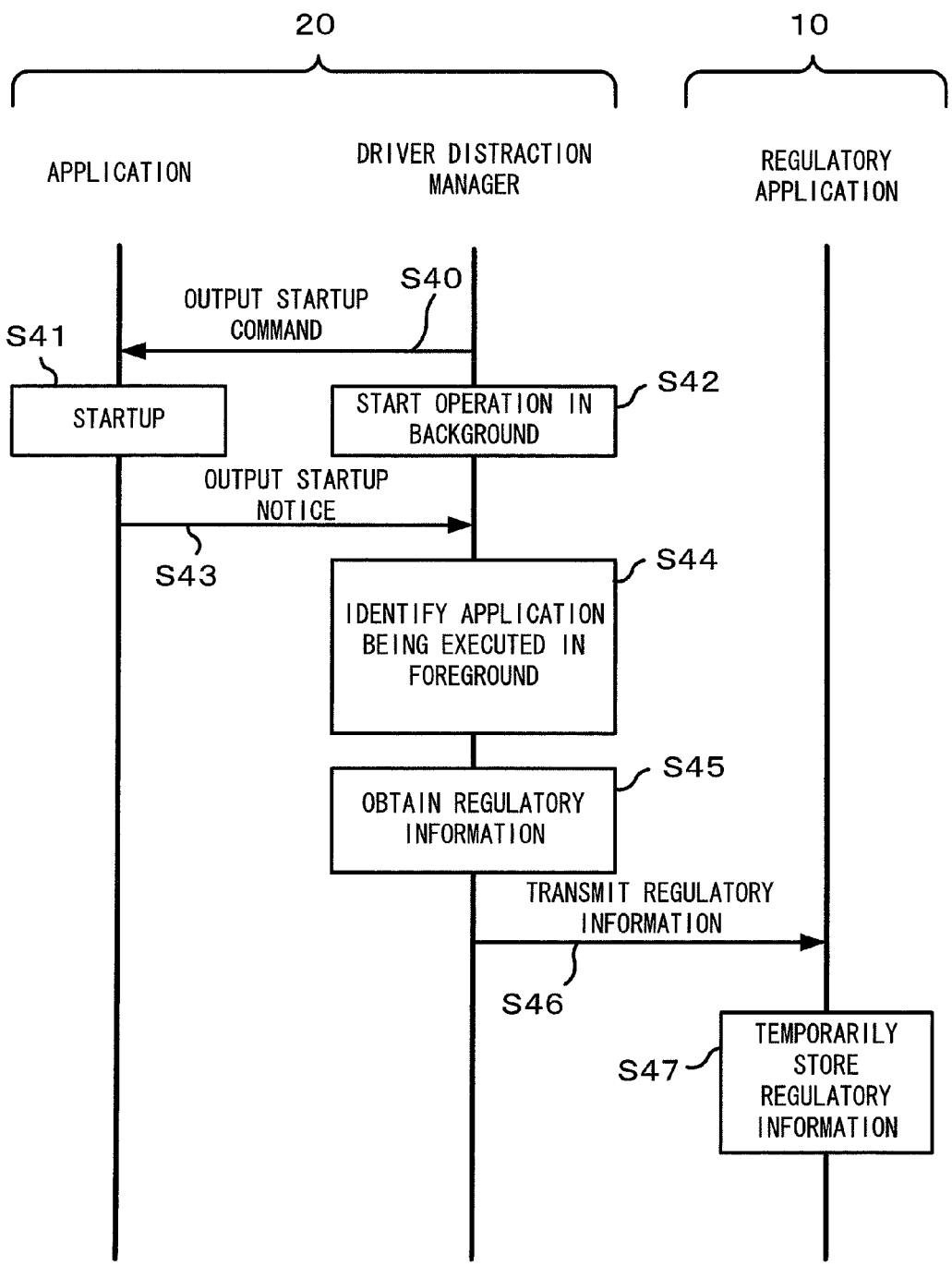
FIG. 8 presents a flowchart of the processing executed so as to display an image related to an application, which is installed in the portable terminal, at the display device in the in-vehicle apparatus in the in-vehicle information system achieved in the first embodiment of the present invention.

FIG. 8 presents a flowchart of the processing executed at the in-vehicle apparatus 1 and the portable terminal 2 in the first embodiment of the present invention described above, in order to restrict certain application operations while the vehicle is in a traveling state. At the start of the processing shown in FIG. 8, the in-vehicle apparatus 1 and the portable terminal 2 are already connected with each other, thereby configuring an in-vehicle information system such as that shown in FIG. 1.

As the user selects an application via the menu screen brought up on display at both the display unit 11 in the in-vehicle apparatus 1 and the display unit 21 in the portable terminal 2, the driver distraction manager 24a executed by the control unit 20 outputs a startup command for the selected application (step S40). In response to this startup command, the application selected by the user is started up and its execution starts in the foreground (step S41). At this time, the driver distraction manager 24a moves to the background (step S42).

The application, the execution of which has started in the foreground, then outputs a startup notice to the driver distraction manager 24a (step S43). The driver distraction manager 24a, having received the startup notice, identifies the application being executed in the foreground (step S44). For instance, the driver distraction manager 24a may identify the application being executed in the foreground based upon the content of the startup notice received in step S43. As an alternative, it may issue a request to the operating system for information enabling identification of the application being executed in the foreground and identify the application being executed in the foreground based upon the response from the operating system.

The driver distraction manager 24a obtains the regulatory information corresponding to the application identified in step S44 as the application being executed in the foreground from the memory unit 24 (step S45). The driver distraction manager 24a then transmits the regulatory information obtained in step S45 to the in-vehicle apparatus 1 via the communication interface unit 26 (step S46).

At the in-vehicle apparatus 1, the regulatory application 14a will have been started up by the control unit 10. The regulatory application 14a receives the regulatory information via the communication interface unit 16 (step S46). The regulatory application 14a then stores, on a temporary basis, the regulatory information received in step S46, into the RAM in the control unit 10 (step S47).

Figure 9:
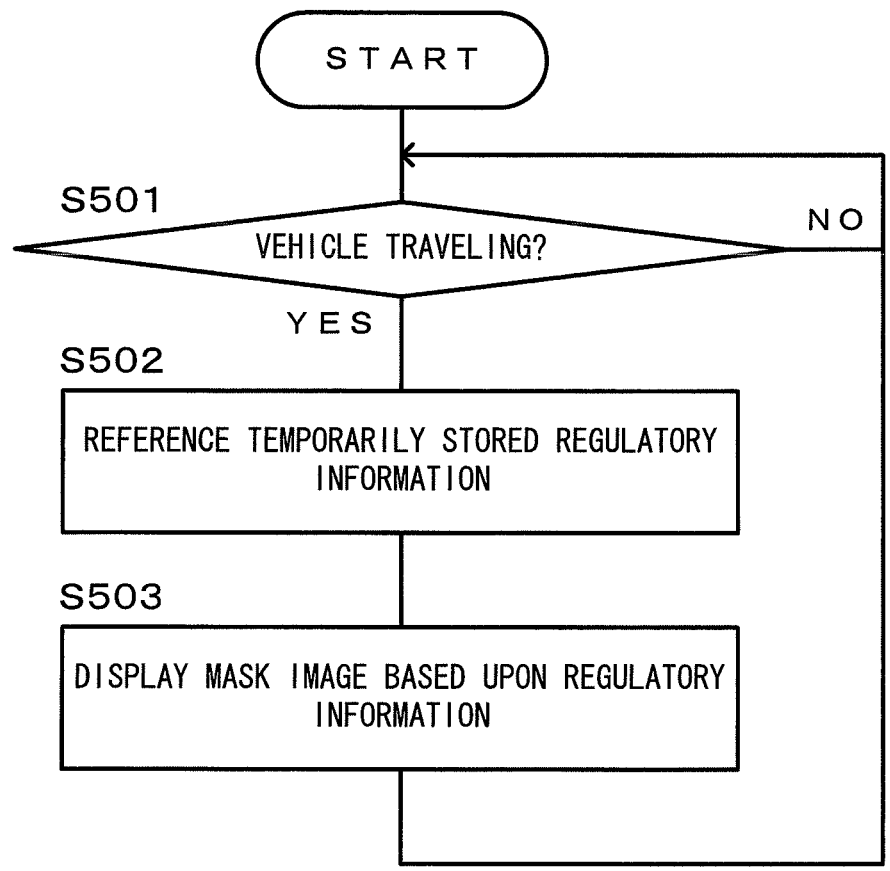
FIG. 9 presents a flowchart of the processing executed by the in-vehicle apparatus in order to designate a specific image area as a non-display area while the vehicle is traveling in the in-vehicle information system achieved in the first embodiment of the present invention.

FIG. 9 presents a flowchart of the processing executed by the regulatory application 14a. The processing shown in FIG. 9 is executed by the control unit 10 where the regulatory information has been temporarily stored into the RAM through the processing executed in step S47 in FIG. 8.

In step S501, the control unit 10 makes a decision as to whether or not the vehicle is currently in a traveling state. The control unit 10 may make this decision by, for instance, deciding whether or not the current vehicle speed is 0, based upon the vehicle speed information. If the vehicle speed is 0, the control unit 10 judges that the vehicle is not traveling and thus makes a negative decision in step S501. However, if the vehicle speed is not 0, the control unit 10 judges that the vehicle is currently in a traveling state and accordingly makes an affirmative decision in step S501. The processing of the regulatory application 14a proceeds to step S502 upon making an affirmative decision in step S501 but remains in step S501 after making a negative decision.

In step S502, the control unit 10 references the regulatory information having been temporarily stored into the RAM. In step S503, the control unit 10 displays a mask image at the display unit 11 based upon the regulatory information referenced in step S502.

Each time an application is started up in step S41 in FIG. 8, the regulatory information corresponding to the particular application is stored into the RAM in the control unit 10 on a temporary basis in step S47 in FIG. 8. The regulatory information, having been updated in this manner, is referenced in step S502 in FIG. 9 and is used for purposes of mask image display in step S503 in FIG. 9 and the like.

Second Embodiment

Figure 10:
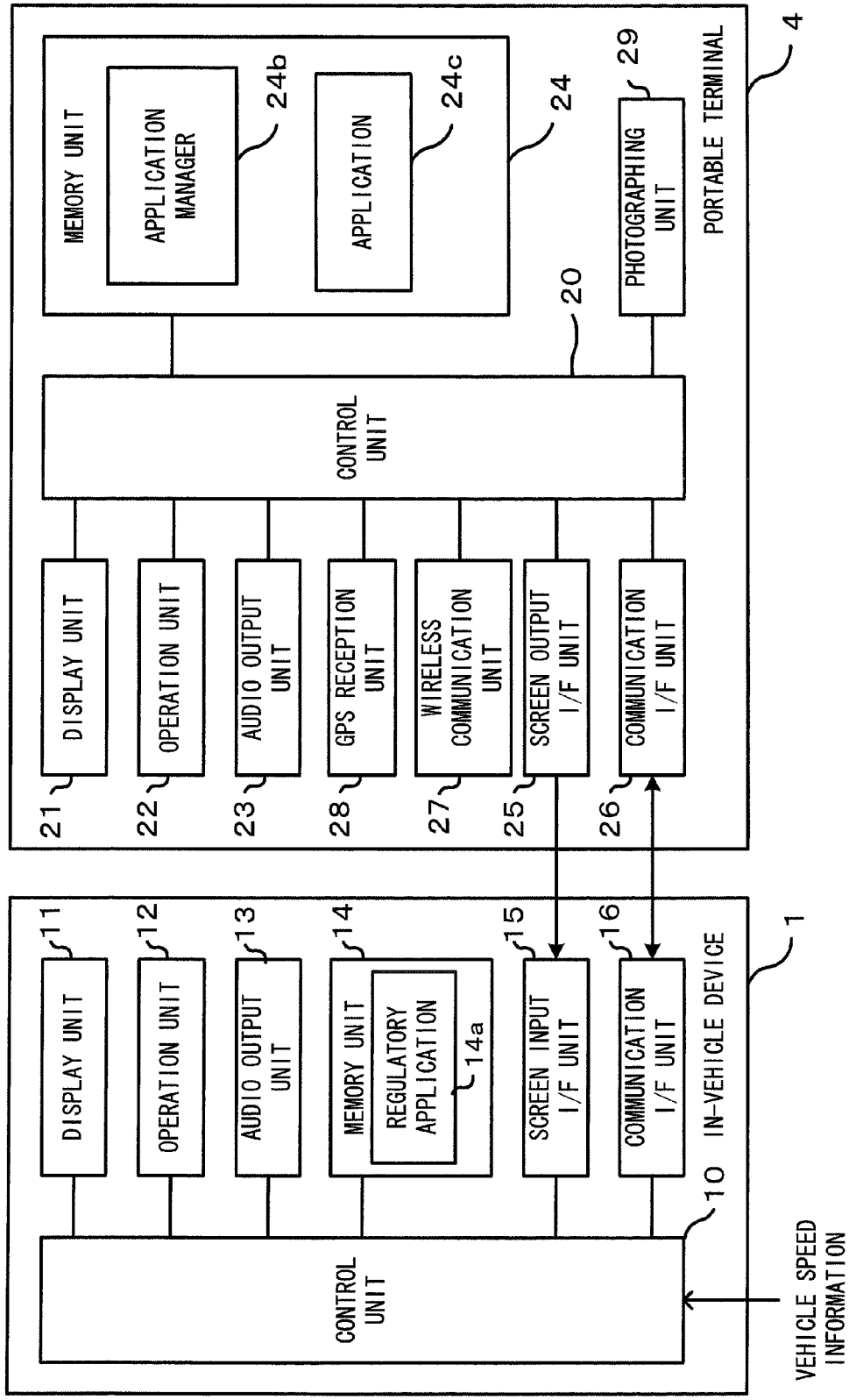
FIG. 10 is a block diagram presenting structural examples pertaining to the in-vehicle apparatus and the portable terminal configuring the in-vehicle information system achieved in a second embodiment of the present invention.

The in-vehicle information system achieved in the second embodiment of the present invention will be described next. FIG. 10 is a block diagram showing the structures of an in-vehicle apparatus 1 and a portable terminal 4 configuring the in-vehicle information system achieved in the second embodiment of the present invention. The portable terminal 4 is distinguishable from the portable terminal 2 with respect to an application stored in a memory unit 24. The same reference numerals are assigned structural elements identical to those in the first embodiment so as to preclude the necessity for a repeated explanation thereof.

An application manager 24b instead of the driver distraction manager 24a is stored in the memory unit 24 at the portable terminal 4. The application manager 24b, which is executed while the coordinated function is in effect, is executed in the foreground as long as another application is not being executed by the control unit 20. However, if another application is being executed by the control unit 20, the application manager 24b is executed in the background. It is to be noted that the term "another application" used in this context does not refer to a control program such as the operating system for the portable terminal 2.

Figure 11:
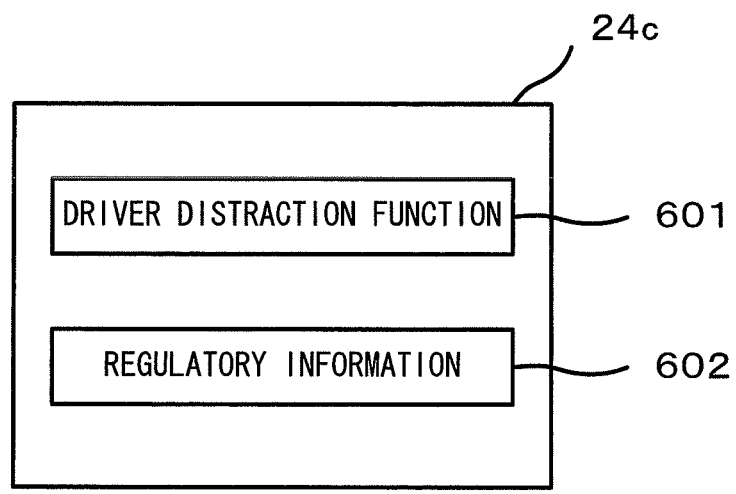
FIG. 11 illustrates part of data included in an application stored in the information terminal in the second embodiment of the present invention.

In addition, another application 24c is stored in the memory unit 24 at the portable terminal 4 in FIG. 10. The application 24c may be, for instance, a navigation application, a media player application or a clock display application featuring photographic images. As shown in FIG. 11, the application 24c contains a driver distractions function 601 and regulatory information 602.

Figure 12:
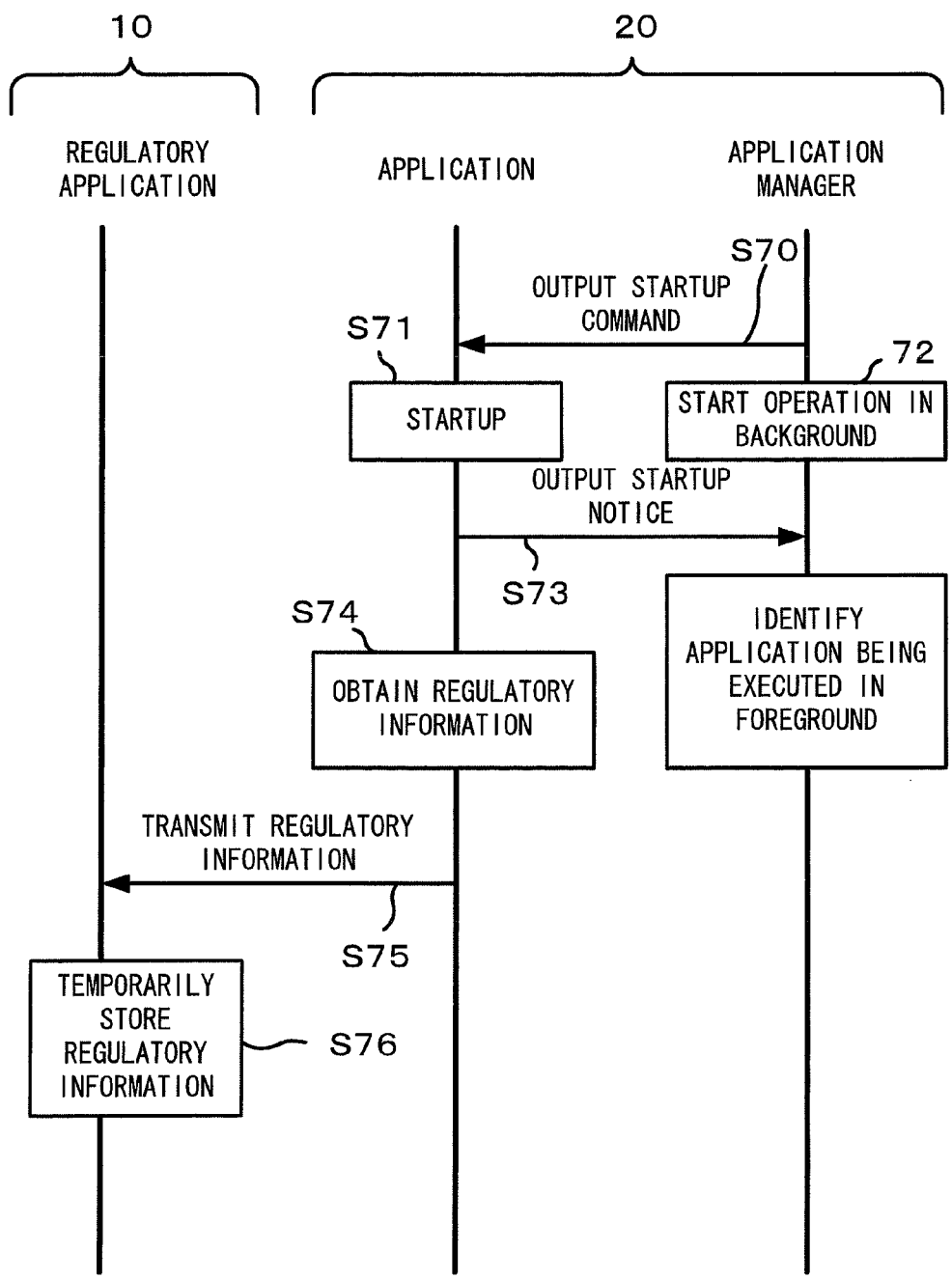
FIG. 12 presents a flowchart of the processing executed so as to display an image related to an application, which is installed in the portable terminal, at the display device in the in-vehicle apparatus in the in-vehicle information system achieved in the second embodiment of the present invention.

FIG. 12 presents a flowchart of the processing executed at the in-vehicle apparatus 1 and the portable terminal 4 in the second embodiment of the present invention, in order to restrict certain application operations while the vehicle is in a traveling state. At the start of the processing shown in FIG. 12, the in-vehicle apparatus 1 and the portable terminal 4 are already connected with each other, thereby configuring an in-vehicle information system substantially equivalent to that shown in FIG. 1. In addition, a menu screen that enables the user to select an application to be started up is displayed at the display unit 11 in the in-vehicle apparatus 1 and at the display unit 21 in the portable terminal 4.

The control unit 20 in the portable terminal 4 executes the application manager 24b. After the user selects the application 24c, the application manager 24b outputs a startup command for the application 24c (step S70). The application 24c, having been selected by the user, is started up in response to this startup command and its execution starts in the foreground (step S71). At this time, the application manager 24b moves to the background (step S72).

The application 24c, the execution of which has started in the foreground, then outputs a startup notice to the application manager 24b (step S73). Subsequently, the application 24c executes the driver distraction function 601 and obtains the regulatory information 602 (step S74). It then transmits the regulatory information 602 thus obtained to the in-vehicle apparatus 1 via the communication interface unit 26 (step S75).

At the in-vehicle apparatus 1, the regulatory application 14a will have been started up by the control unit 10. The regulatory application 14a receives the regulatory information via the communication interface unit 16 (step S76). The regulatory application 14a then stores, on a temporary basis, the regulatory information received in step S76, into the RAM in the control unit 10.

As FIG. 12 clearly indicates, the functions of the driver distraction manager 24a in the first embodiment are fulfilled in the second embodiment by using the application manager 24b, which executes application startup control, and the driver distraction function 601, which enables the transmission of the regulatory information 602 to the in-vehicle apparatus 1.

Third Embodiment

The in-vehicle information system achieved in the third embodiment of the present invention will now be described. The in-vehicle information system achieved in the third embodiment of the present invention is distinguishable from those achieved in the first and second embodiments in the content of the regulatory information used therein. In the third embodiment, regulatory reference images, to be used to obscure restriction imposed image areas, are stored in the memory unit 14 in the in-vehicle apparatus 1.

Figure 13A:
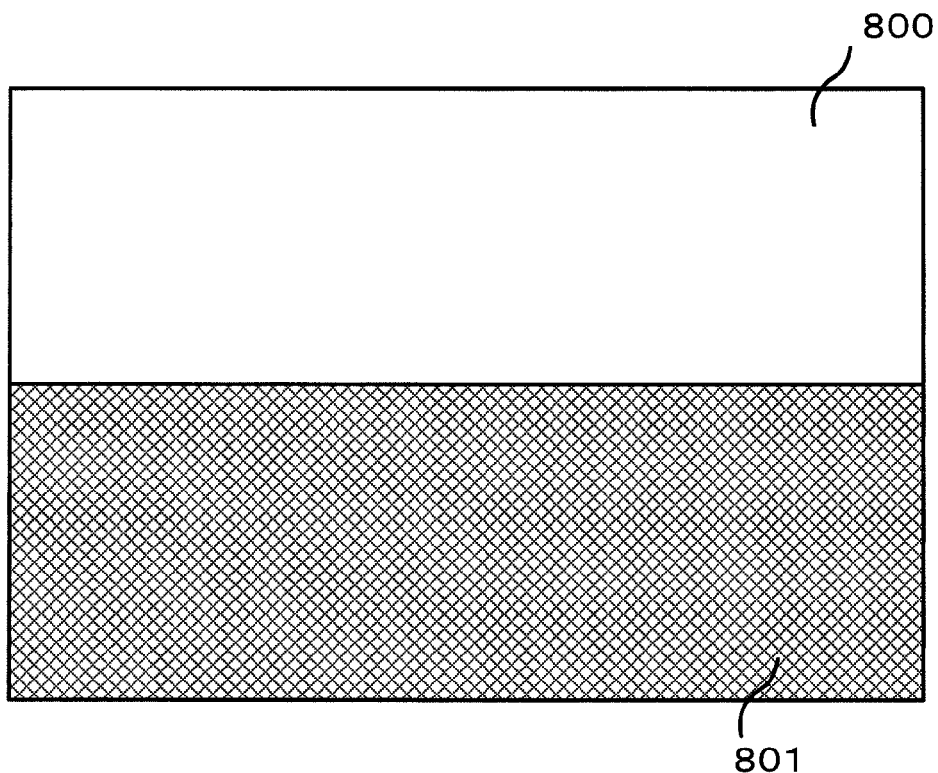
FIGS. 13A and 13B provide illustrations in reference to which a regulatory reference image stored in the information terminal in the in-vehicle information system achieved in a third embodiment of the present invention will be explained.

FIG. 13A presents an example of a regulatory reference image that may be stored in the memory unit 14 in the in-vehicle apparatus 1. A regulatory reference image 800 in FIG. 13A includes a mask image 801 used to obscure the lower half of the display screen from view. In the memory unit 14 in the in-vehicle apparatus 1, a plurality of regulatory reference images, including a regulatory reference image used to obscure the entire display screen, a regulatory reference image used to obscure the left half of the display screen, a regulatory reference image used to obscure the right half of the display screen, a regulatory reference image used to obscure the upper half of the display screen, and a special regulatory reference image such as that shown in FIG. 14, as well as the regulatory reference image in FIG. 13A, are stored. The driver distraction manager 24*a* at the portable terminal 2 transmits regulatory information indicating a specific regulatory reference image to be brought up on display at the display unit 11 to the in-vehicle apparatus 1 via the communication interface unit 26. Such regulatory information transmitted to the in-vehicle apparatus 1 may carry, for instance, an instruction [regulatory reference image: image ID assigned to the regulatory reference image used to obscure the lower half]. The control unit 10 in the in-vehicle apparatus 1 then displays the regulatory reference image specified in the regulatory information having been transmitted from the control unit 20 in the portable terminal 2 by superimposing the image over the application image.

Figure 13B:
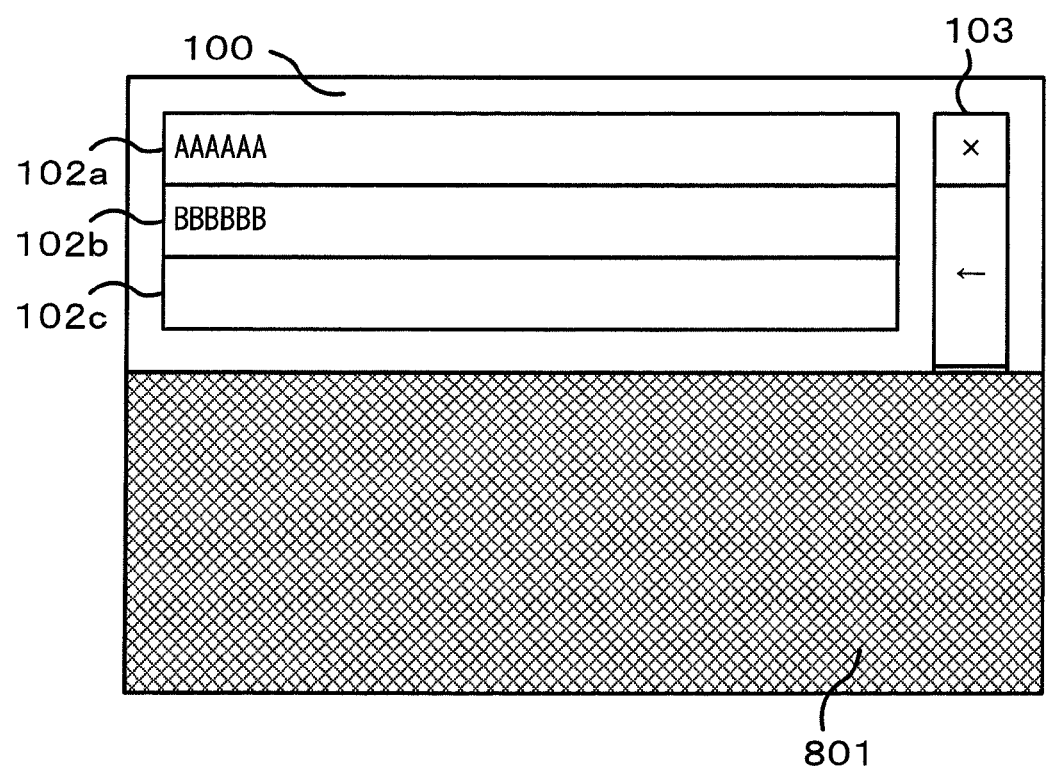

FIG. 13B shows the regulatory reference image 800 in FIG. 13A displayed over the route setting screen 100 in FIG. 3A having been brought up on display at the display unit 11 in the in-vehicle apparatus 1. The mask image 801 in the regulatory reference image 800 obscures the text input area 101 in the route setting screen shown in FIG. 3A, which tends to draw the driver's attention from the road. Once the text input area 101 becomes obscured by the mask image 801 superimposed thereupon, a touch operation in the area performed by the user will not be accepted. For instance, even if the user touches the screen area where the route setting screen 100 in FIG. 3A has been displayed, the coordinate information corresponding to the position having been touched by the user is not transmitted to the portable terminal 2 in the example presented in FIG. 13B.

Figure 14:
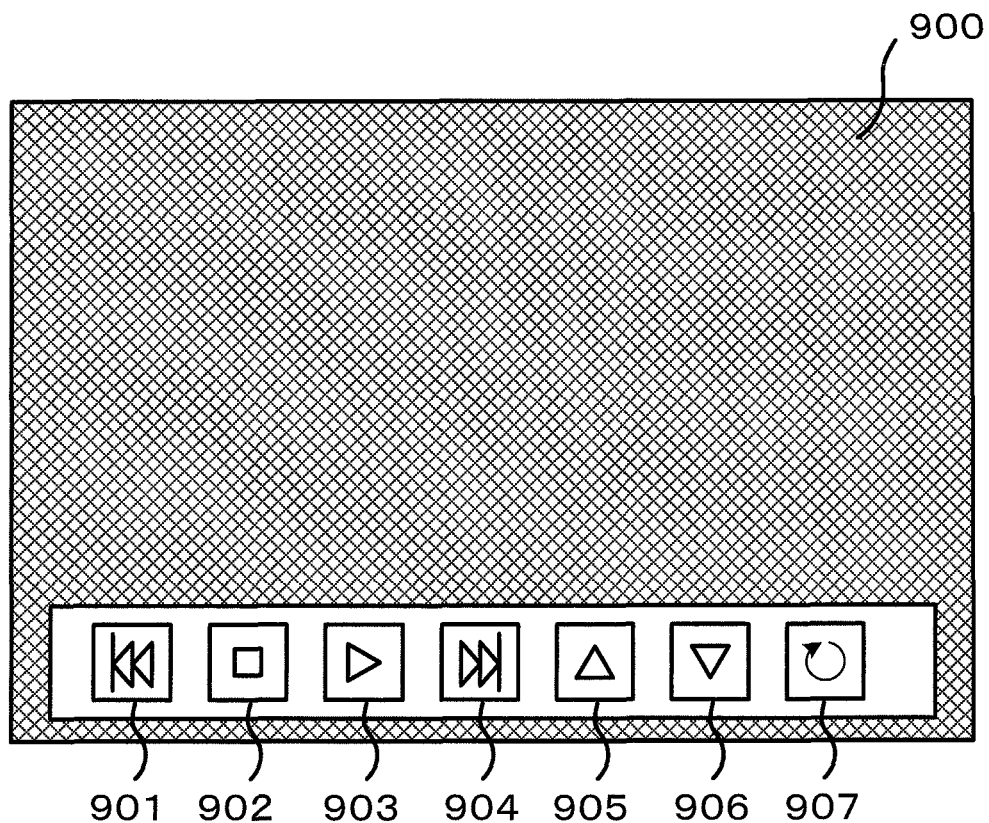
FIG. 14 provides an illustration in reference to which a regulatory reference image stored in the information terminal in the in-vehicle information system in the third embodiment of the present invention will be explained.

FIG. 14 presents an example of a regulatory reference image that may be stored in the memory unit 14 in the in-vehicle apparatus 1. The regulatory reference image shown in FIG. 14 is used while the media player application is being executed. The regulatory reference image 900 in FIG. 14 includes a mask image used to obscure the entire display screen from view and operation buttons 901 through 907.

While the operation buttons 901 through 907 are part of the regulatory reference image, they still retain functions respectively similar to those of the operation buttons 203 through 209 in FIG. 5A. As the user touches an operation button among the operation buttons 901 through 907, the corresponding coordinate information is transmitted to the portable terminal 2. At the portable terminal 2, the image areas over which the operation buttons 901 through 907 are displayed in the regulatory reference image are stored in the memory 24. Based upon the coordinate information transmitted to the portable terminal 2, the control unit 20 in the portable terminal 2 executes the operation corresponding to the particular operation button among the operation buttons 901 through 907. By using the regulatory reference image that includes such operation buttons, it is an ensured that the minimum function of the application is still available to the user.

The following advantages are achieved through the embodiments of the present invention described above. The in-vehicle information systems achieved in the first, second and third embodiments of the present invention each include a portable terminal 2 representing a type of information terminal and an in-vehicle apparatus 1 installed in a vehicle, as shown in FIG. 1. As FIG. 2 or FIG. 10 indicates, the control unit 10 in the in-vehicle apparatus 1 makes a decision as to whether or not the vehicle is currently in a traveling state based upon vehicle speed information obtained from the vehicle. The in-vehicle apparatus 1 includes a control unit and a display unit 11. The control unit 10 imposes a restriction while the vehicle is traveling so as to obscure part of or all of the display screen by displaying a mask image at the display unit 11. At the portable terminal 2, applications such as a navigation application and a media player application and regulatory information are stored in its memory unit 24. The portable terminal 2 outputs an image corresponding to an specific application to the in-vehicle apparatus 1 via a screen output interface unit 25. In addition, the portable terminal 2 outputs the regulatory information to the in-vehicle apparatus 1 via a communication interface unit 26. The control unit 10 in the in-vehicle apparatus 1 displays the mask image at the display unit 11 by using this regulatory information. Through these measures, driving safety can be assured even when the portable terminal 2 is connected to the in-vehicle apparatus 1 and an image is output to the in-vehicle apparatus 1 by executing an application installed in the portable terminal 2 while the vehicle travels.

The embodiments described above allow for the following variations.

(Variation 1)

While the mask images used in the embodiments are rectangular, the present invention is not limited to this example and mask images assuming other shapes, such as a polygonal shape or a round shape, may be used instead. The regulatory information corresponding to a polygonal mask image should indicate the coordinates of all the vertices in a specific order along the perimeter of the polygon. In addition, the regulatory information corresponding to a round mask image should indicate the coordinates of the center of the circle and coordinates that can be used to specify the radius of the circle.

(Variation 2)

While the regulatory information includes the coordinates to be used for purposes of mask image display in the first and second embodiments, such regulatory information may further include color information (indicating the hue, the saturation and the brightness of the mask image), information indicating a specific mask image pattern (solid, hatched, or the like), display timing information and the like.

(Variation 3)

While the regulatory information is output each time the user selects an application in the embodiments described above, the regulatory information may instead be output each time the display screen is switched.

(Variation 4)

Both the driver distraction manager 24*a* and the application manager 24*b* may be stored in the memory unit 24. In such a case, the application manager 24*b* should fulfill the function of application startup control and the driver distraction manager 24*a* should output the regulatory information to the in-vehicle apparatus 1.

(Variation 5)

Even when the coordinated function achieved in coordination with the portable terminal 2 is in effect, the regulatory application 14*a* may impose a specific restriction while the vehicle is in a traveling state. For instance, it may impose a restriction so as to obscure a specific image area while an application for the in-vehicle apparatus 1, stored in the memory unit 14 of the in-vehicle apparatus 1, is being executed.

(Variation 6)

The communication cable 3 may include a cable through which image signals are transmitted, such as a composite AV cable. However, the communication interface unit 16 does not execute interface processing in conjunction with a composite AV cable or the like.

(Variation 7)

At the display unit 11, image display may be provided so that the image viewed from the passenger seat is different from the image viewed from the driver's seat. In such a case, a restriction only needs to be imposed for the image display viewed from the driver's seat while the vehicle is traveling.

(Variation 8)

The decision as to whether or not the vehicle is currently in a traveling state may be made in step S501 in FIG. 9 based upon the vehicle speed information obtained by the control unit 10 or based upon GPS signals received at the GPS reception unit 28 in the portable terminal 2. In addition, the decision as to whether or not the vehicle is currently in a traveling state may be made by the control unit 20 in the portable terminal 2, and, in such a case, the decision-making results may be output to the in-vehicle apparatus 1 via the communication interface unit 26.

The embodiments and variations thereof described above simply represent examples and, as long as features characterizing the present invention remain intact, the present invention is in no way limited to the particulars of these embodiments and variations. In addition, the embodiments and the variations may be adopted singly or in any combination.

What is claimed is:

1. An in-vehicle information system, comprising:
an information terminal that is a portable terminal; and
an in-vehicle apparatus installed at a fixed position in a vehicle independently from the information terminal, wherein:
at least one of the information terminal and the in-vehicle apparatus includes a traveling decision-making unit that makes a decision as to whether or not the vehicle is currently in a traveling state;
the in-vehicle apparatus includes
a display unit that displays an image at a display screen, and
a display regulating unit that restricts an image area ranging over part of or all of the display screen to be obscured from view when the traveling decision-making unit decides that the vehicle is currently in a traveling state;
the information terminal includes
a first storage unit in which an application is stored,
a control unit that executes the application,
an image output unit that outputs an image corresponding to the application executed by the control unit to the in-vehicle apparatus, and
a regulatory information output unit that obtains regulatory information of the application executed by the control unit and outputs the regulatory information to the in-vehicle apparatus, the regulatory information being information pertaining to an image area to be restricted by the display regulating unit within the image corresponding to the application executed by the control unit; and
the display regulating unit inputs the regulatory information outputted by the regulatory information output unit and sets an image area in the display screen to be restricted for being obscured from view by using the inputted regulatory information.

2. An in-vehicle information system according to claim 1, wherein:
the in-vehicle apparatus further includes a second storage unit in which a regulatory image, to be used to restrict part of or all of the display screen to be obscured from view, is stored; and
the display regulating unit restricts an image area ranging over part of or all of the display screen to be obscured from view by using the regulatory image.

3. An in-vehicle information system according to claim 2, wherein:
the regulatory information specifies the regulatory image to be used by the display regulating unit.

4. An in-vehicle information system according to claim 1, wherein:
the regulatory information specifies a shape of an image area to be restricted for being obscured from view.

5. An in-vehicle information system according to claim 1, wherein:
the display unit includes a touch panel at which a touch operation is accepted; and
the in-vehicle apparatus further includes an operation information transmission unit that transmits, in response to the touch operation performed in an image area that is not restricted not to be obscured from view by the display regulating unit, operation information corresponding to the touch operation to the information terminal and does not transmit, following the touch operation performed in an image area that is restricted to be obscured from view by the display regulating unit, operation information corresponding to the touch operation to the information terminal.

6. An in-vehicle information system according to claim 1, wherein:
an image area restricted by the display regulating unit to be obscured from view is an image area where at least one of an image enabling text input, an image that changes constantly and a photographic image is displayed.

7. An in-vehicle apparatus that is installed in a vehicle and can be connected to an external information terminal at which execution of an application is underway, comprising:
a display unit that inputs, from the external information terminal, an image corresponding to the application executed in the external information terminal and displays the image corresponding to the application executed in the external information terminal at a display screen; and
a display regulating unit that inputs, from the external information terminal, regulatory information of the application executed in the external information terminal and restricts an image area ranging over part of or all of the display screen to be obscured from view based on the inputted regulatory information while the vehicle is in a traveling state, wherein:
the regulatory information of the application executed in the external information terminal is information pertaining to an image area restricted by the display regulating unit within the image corresponding to the application executed in the external information terminal.

8. An in-vehicle apparatus according to claim 7, further comprising:
a storage unit in which a regulatory image to be used to restrict an image area ranging over part of or all of the display screen to be obscured from view, is stored, wherein:
the display regulating unit restricts the image area ranging over part of or all of the display screen by using the regulatory image to be obscured from view.

9. An in-vehicle apparatus according to claim 8, wherein:
the regulatory information specifies the regulatory image to be used by the display regulating unit.

10. An in-vehicle apparatus according to claim 7, wherein:
the regulatory information specifies a shape of an image area to be restricted for being obscured from view.

11. An in-vehicle apparatus according to claim 7, wherein:
the display unit includes a touch panel where a touch operation is accepted; and
there is further provided an operation information transmission unit that transmits, in response to the touch operation performed in an image area that is not restricted not to be obscured from by the display regulating unit, operation information corresponding to the touch operation to the information terminal and does not transmit, following the touch operation performed in an image area that is restricted to be obscured from by the display regulating unit, operation information corresponding to the touch operation to the information terminal.

12. An in-vehicle apparatus according to claim 7, wherein:
an image area restricted by the display regulating unit to be obscured from view is an image area where at least one of an image enabling text input, an image that changes constantly and a photographic image is displayed.

13. An in-vehicle apparatus according to claim 7, further comprising:
a traveling decision-making unit that makes a decision as to whether or not the vehicle is currently in a traveling state.

14. An information terminal that is a portable terminal and can be connected to an in-vehicle apparatus including a display unit installed at a fixed position in a vehicle independently from the informational terminal, comprising:
a first storage unit in which an application is stored,
a control unit that executes the application,
an image output unit that outputs an image corresponding to the application executed by the control unit to the in-vehicle apparatus; and
a regulatory information output unit that obtains regulatory information of the application executed by the control unit and outputs the regulatory information to the in-vehicle apparatus, the regulatory information being information pertaining to an image area to be restricted for being obscured from view at the display unit within the image corresponding to the application executed by the control unit.

15. An information terminal according to claim 14, further comprising:
a traveling decision-making unit that makes a decision as to whether or not a vehicle in which the in-vehicle apparatus is installed is currently in a traveling state.

16. An in-vehicle information system according to claim 1, wherein:
the in-vehicle apparatus further includes a second storage unit in which the regulatory information outputted by the regulatory information output unit is stored;
the regulatory information output unit outputs the regulatory information to the in-vehicle apparatus regardless of whether the vehicle is currently in a traveling state;
the second storage unit stores the regulatory information outputted by the regulatory information output unit regardless of whether the vehicle is currently in a traveling state;
the display regulating unit references the regulatory information stored in the second storage unit when the traveling decision-making unit decides that the vehicle is currently in a traveling state, and sets an image area in the display screen to be restricted for being obscured from view by using the referenced regulatory information; and
the display regulating unit does not reference the regulatory information stored in the second storage unit when the traveling decision-making unit does not decide that the vehicle is currently in a traveling state, and does not set an image area in the display screen to be restricted for being obscured from view.

17. An in-vehicle apparatus according to claim 7, further comprising:
a storage unit that inputs the regulatory information of the application executed in the external information terminal from the external information terminal regardless of whether the vehicle is currently in a traveling state and stores the inputted regulatory information, wherein:
the display regulating unit references the regulatory information stored in the storage unit when it is decided that the vehicle is currently in a traveling state, and restricts an image area ranging over part of or all of the display screen to be obscured from view by using the referenced regulatory information; and
the display regulating unit does not reference the regulatory information stored in the storage unit when it is not decided that the vehicle is currently in a traveling state, and does not restrict an image area ranging over part of or all of the display screen to be obscured from view.

18. An information terminal according to claim 14, wherein:
the regulatory information output unit obtains the regulatory information of the application executed by the control unit and outputs the regulatory information to the in-vehicle apparatus, regardless of whether the vehicle in which the in-vehicle apparatus is installed is currently in a traveling state.

* * * * *